United States Patent [19]

Kurnit

[11] 4,389,617
[45] Jun. 21, 1983

[54] COMBINATION RING CAVITY AND BACKWARD RAMAN WAVEGUIDE AMPLIFIER

[75] Inventor: Norman A. Kurnit, Santa Fe, N. Mex.

[73] Assignee: The United States of America as represented by the United States Department of Energy, Washington, D.C.

[21] Appl. No.: 243,309

[22] Filed: Mar. 13, 1981

[51] Int. Cl.³ .................... H03F 7/00; H03F 7/05; H01S 3/30
[52] U.S. Cl. .................................. 330/4.3; 372/3; 372/94; 307/426
[58] Field of Search ............... 330/4.3, 4.5, 4.6; 372/3, 14, 94, 96; 307/426

[56] References Cited

U.S. PATENT DOCUMENTS

| Re. 30,898 | 4/1982 | Cantrell et al. | 307/426 |
| 3,815,043 | 6/1974 | Corman et al. | 372/3 |
| 3,914,709 | 10/1975 | Pike et al. | 372/94 |
| 4,194,168 | 11/1977 | Jarrett et al. | 372/94 |
| 4,205,278 | 5/1980 | George et al. | 330/4.3 |
| 4,278,902 | 7/1981 | Lay et al. | 307/426 |
| 4,280,109 | 7/1981 | Stappaerts | 372/3 |
| 4,306,195 | 12/1981 | Stappaerts | 307/426 |

OTHER PUBLICATIONS

Basor et al, Hydrogen Raman Laser . . . Optical Pulses, 6/79, pp. 780–781, Soo. J. Quantum Electra, 9 (6).
Ewing et al, "Optical Pulse Compressor Systems for Laser Fusion", 5/79, IEEE J. QE., vol. QE-15, #5.
Rabinowitz et al, "Efficient Tunable H₂ . . . Laser", 11/15/79, pp. 739, 741, Appl. Phys. Lett., vol. 35, #10.
Bierry et al, "Multimegawatt . . . Source . . . ", 7/77, Rev. Sci. Instrum., vol. 48, #7.

Primary Examiner—Nelson Moskowitz
Attorney, Agent, or Firm—William W. Cochran, II; Paul D. Gaetjens; Richard G. Besha

[57] ABSTRACT

A combination regenerative ring and backward Raman waveguide amplifier and a combination regenerative ring oscillator and backward Raman waveguide amplifier which produce Raman amplification, pulse compression, and efficient energy extraction from the $CO_2$ laser pump signal for conversion into a Stokes radiation signal. The ring cavity configuration allows the $CO_2$ laser pump signal and Stokes signal to copropagate through the Raman waveguide amplifier. The backward Raman waveguide amplifier configuration extracts a major portion of the remaining energy from the $CO_2$ laser pump signal for conversion to Stokes radiation. Additionally, the backward Raman amplifier configuration produces a Stokes radiation signal which has a high intensity and a short duration. Adjustment of the position of overlap of the Stokes signal and the $CO_2$ laser pump signal in the backward Raman waveguide amplifiers alters the amount of pulse compression which can be achieved.

6 Claims, 4 Drawing Figures

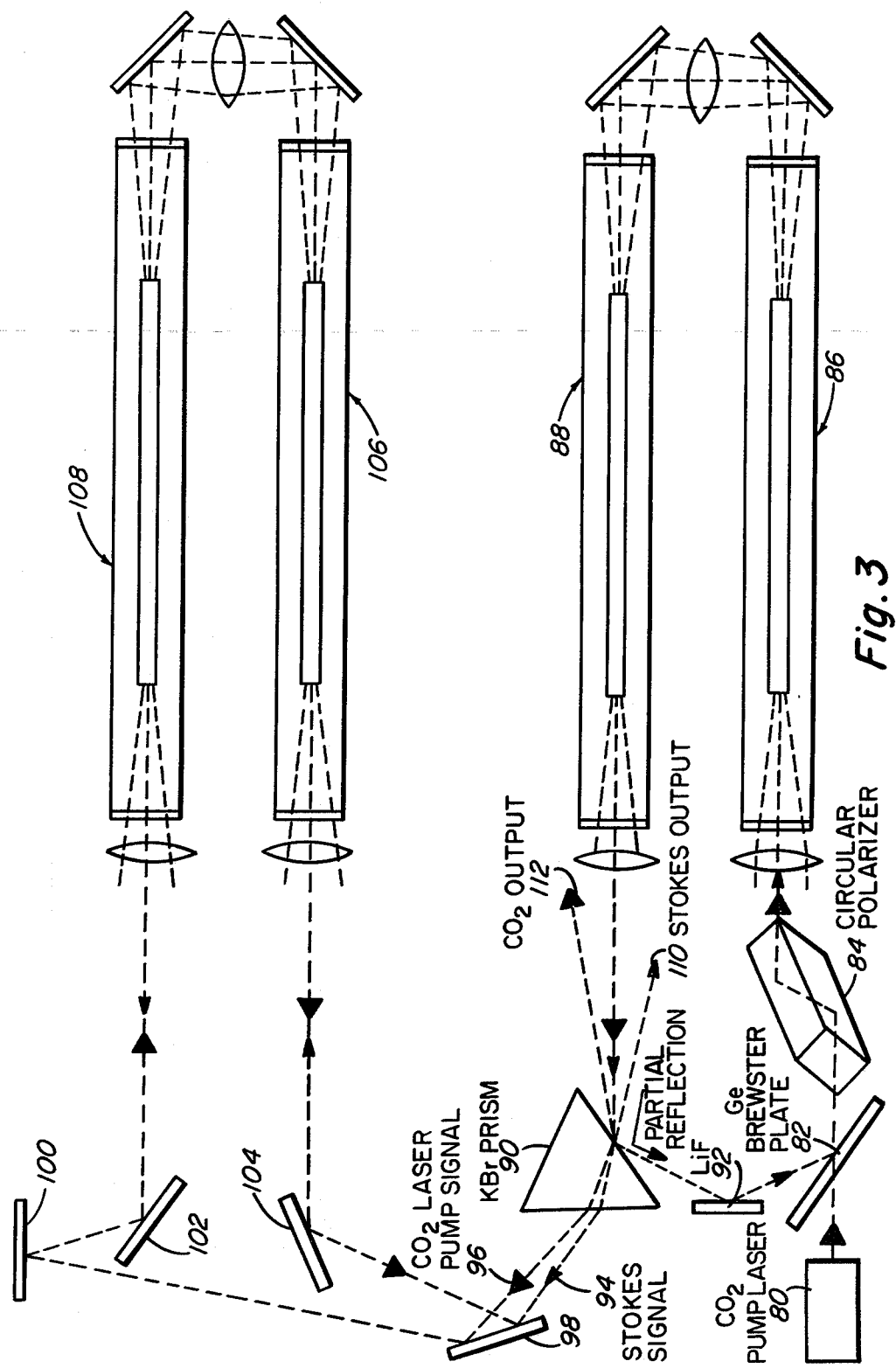

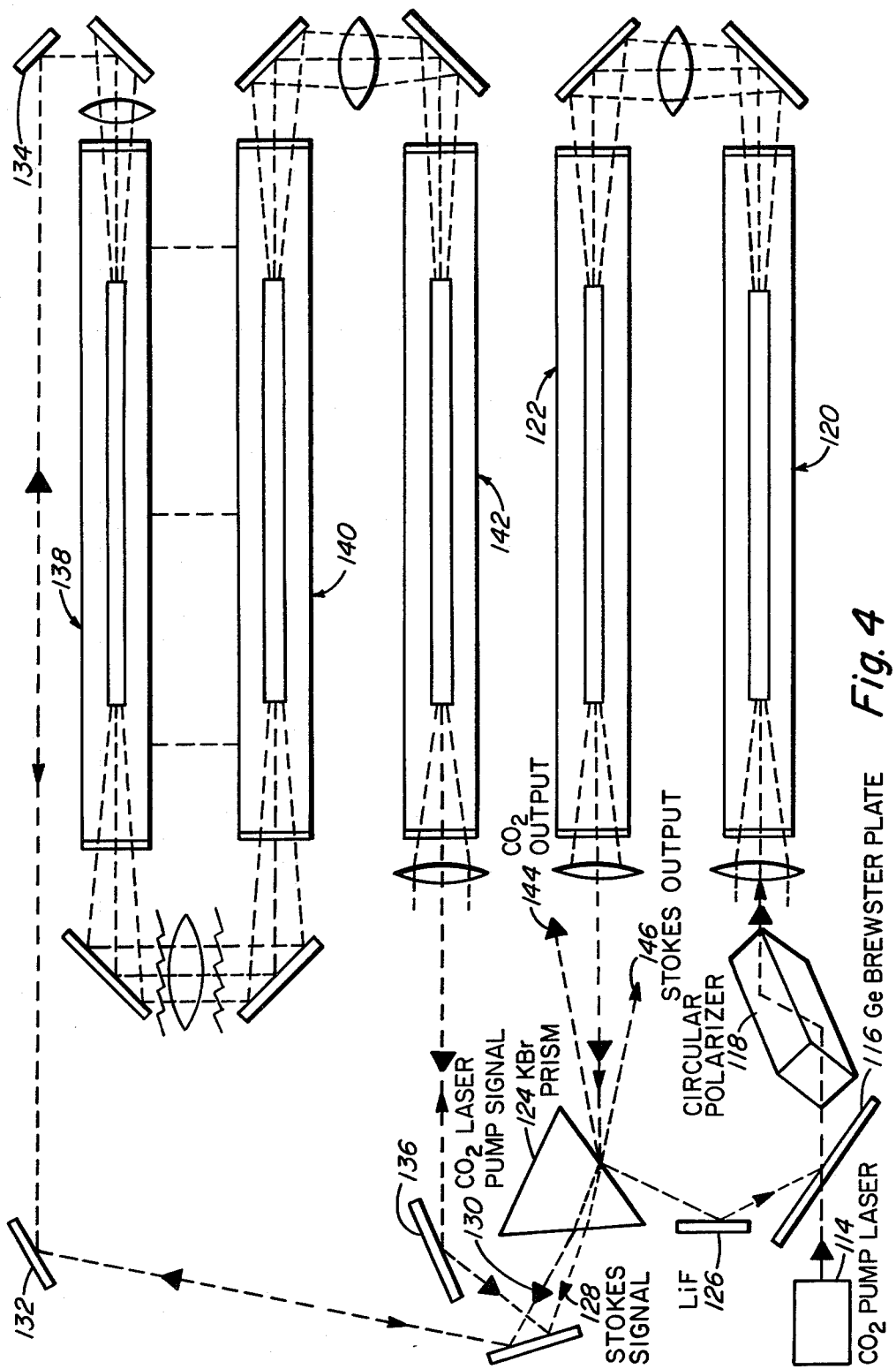

COMBINATION RING CAVITY AND BACKWARD RAMAN WAVEGUIDE AMPLIFIER

This invention is a result of a contract with the Department of Energy (Contract W-7405-ENG-36).

BACKGROUND OF THE INVENTION

The present invention pertains generally to lasers and more particularly to stimulated Raman scattering utilizing rotational transitions in a diatomic molecular gas.

The present invention comprises an improvement over U.S. Pat. No. 4,222,011 issued Sept. 9, 1980, to Norman A. Kurnit entitled "Stokes Injected Raman Capillary Waveguide Amplifier" and application Ser. No. 229,023 filed Jan. 27, 1981 by Norman A. Kurnit entitled "A Ring cavity For A Raman Capillary Waveguide Amplifier." The disclosures of the above referenced patent and application are hereby incorporated by reference.

As disclosed in the above referenced patent, various methods have been disclosed for shifting frequencies of conventional lasers in the ir spectrum. These methods have included four wave mixing as disclosed in U.S. Pat. No. 4,095,121 by Richard F. Begley et al., entitled "Resonantly Enhanced Four Wave Mixing," and "Raman Scattering," as disclosed in U.S. Pat. No. 4,061,921 by C. D. Cantrell et al. entitled "Infrared Laser Systems" and reissue application Ser. No. 967,171 filed Mar. 16, 1979 by C. D. Cantrell et al., entitled "Infrared Laser System," now U.S. Pat. Re. No. 30,898. In each of these systems and other previous systems of ir frequency shifting to a broad range of frequencies, simplicity and overall efficiency are important factors for economic utilization of the device.

Since this stimulated Raman effect can be produced in a single step with high conversion efficiency, Raman shifting of $CO_2$ laser radiation provides high overall efficiencies due to the high efficiencies and well developed technology of $CO_2$ lasers. However, Raman gain in gaseous media such a $H_2$, $D_2$, HD, HT, DT, or $T_2$, require powers which are near the breakdown threshold of these diatomic molecular gases for a single pass focus geometry such as suggested by Robert L. Byer in an article entitled "A 16 Micron Source for Laser Isotope Enrichment" published in IEEE Journal of Quantum Electronics, QE-12, pp 732–733, November 1976.

The above-referenced U.S. Pat. No. 4,222,011 by Norman A. Kurnit discloses a capillary waveguide amplifier and regenerative amplifier which utilize a Stokes injection source to reduce the required field strength of the $CO_2$ laser radiation and eliminate the necessity for spontaneous generation of Stokes radiation within the capillary waveguide amplifier. However, in a single pass waveguide amplifier configuration, high output energies are not always obtainable due to the limited output power of the Stokes injection source. The use of a regenerative amplifier, such as disclosed in FIG. 2 of the above-referenced patent, fails to overcome the problems of the single pass geometry since the power of the Stokes injection source is limited by the dichroic mirrors utilized in the regenerative system and since the only significant gain produced in the capillary waveguide amplifier is achieved when the Stokes signal is copropagating with the $CO_2$ laser pump radiation in the forward direction. Although it is possible to reflect back the $CO_2$ radiation so that both the Stokes and $CO_2$ laser pump signal copropagate in both the forward and reverse directions in the regenerative capillary waveguide amplifier, the field intensity may be increased beyond the breakdown threshold of the Raman scattering medium gas. When this occurs, no gain can be achieved.

Additionally, since the Stokes source in many applications has a pulse width much smaller than the $CO_2$ laser pulse width, only a small fraction of the $CO_2$ laser energy can be extracted in a system such as disclosed in the above-referenced U.S. Pat. No. 4,222,011. Consequently, it would be desirable to extract energy over a broader range of the $CO_2$ laser pulse width.

The above-referenced U.S. patent application Ser. No. 229,023, filed by Norman A. Kurnit entitled "A Ring Cavity For A Raman Capillary Waveguide Amplifier," of which the present invention comprises an improvement, discloses a ring cavity configuration for extracting energy from a latter portion of the $CO_2$ pulse so as to provide better temporal overlap. Additionally, the Stokes signal copropagates with the $CO_2$ laser pulse around the ring cavity to thereby provide complete spatial overlap. The combination of these factors allows a much greater portion of the $CO_2$ laser pulse energy to be extracted.

However, it is also desirable to convert the very early and very late part of the $CO_2$ pulse to the Stokes frequency, particularly if the $CO_2$ laser is run in a long pulse mode in order to increase the $CO_2$ laser energy extraction efficiency. In this case, it may be desirable to compress the energy in the long $CO_2$ pulse into a shorter Stokes pulse by means of backward stimulated Raman scattering. It is well known that, despite the generally lower gain for counterpropogating pump and Stokes, a strong Stokes pulse is capable of virtually complete depletion of the pump which passes through it in the Raman-active medium. Thus, long pump pulses can be converted to short duration Stokes pulses of much higher peak power by passing them in opposite directions through a Raman medium whose length is one half the sum of the spatial extents of the two pulses.

Although the ring cavity configuration extracts a large portion of the energy from the $CO_2$ pulse and requires a much smaller Stokes source in the amplifier configuration, the ring cavity configuration is not necessarily capable of pulse compression and virtually complete extraction of energy from the $CO_2$ pulse.

SUMMARY OF THE INVENTION

It is therefore an object of the present invention to provide a combination regenerative ring and backward Raman waveguide amplifier.

It is also an object of the present invention to provide a combination ring cavity for a Stokes injected Raman waveguide amplifier and a backward Raman waveguide amplifier system.

Another object of the present invention is to provide a combination regenerative ring oscillator and backward Raman waveguide amplifier system.

Another object of the present invention is to provide a combination regenerative ring configuration and backward Raman waveguide amplifier capable of pulse compression and efficient energy extraction from the $CO_2$ laser pump signal.

Additional objects, advantages and novel features of the invention will be set forth in part in the description which follows, and, in part, will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the device of this invention may comprise a combination regenerative ring and backward Raman waveguide amplifier comprising: $CO_2$ laser means for producing a $CO_2$ laser pump signal; Stokes radiation source means for producing a Stokes radiation signal; means for combining said $CO_2$ laser pump signal and said Stokes radiation signal to produce a combined copropagating $CO_2$ laser pump signal and Stokes radiation signal; means for directing said copropagating $CO_2$ laser pump signal and Stokes radiation signal through Raman scattering waveguide amplifier means to produce an amplified Stokes radiation signal by Raman scattering of said $CO_2$ laser pump signal using rotational transitions in a diatomic molecular gas; means for splitting said amplified Stokes radiation signal and said $CO_2$ laser pump signal into first and second portions; means for combining said first portion of said amplified Stokes radiation signal with said combined copropagating $CO_2$ laser pump signal and said Stokes radiation signal in a single beam path to increase the intensity of Stokes radiation in said regenerative ring amplifier and thereby increase the amount of energy extracted from said $CO_2$ laser pump signal; means for directing said second portion of said amplified Stokes radiation signal through backward Raman waveguide amplifier means in a first direction; means for directing said second portion of said $CO_2$ laser pump signal through said backward Raman waveguide amplifier means in a second direction, opposite to said first direction, so that said $CO_2$ laser pump signal and said amplified Stokes radiation signal counterpropagate through said backward Raman waveguide amplifier means to produce backward Raman amplification, pulse compression, and efficient energy extraction from said $CO_2$ laser pump signal.

The present invention may also comprise, in accordance with its objects and purposes, a combination ring cavity for a Stokes injected Raman waveguide amplifier and backward Raman waveguide amplifier system comprising: a source of $CO_2$ laser pump radiation; an external source of Stokes radiation; waveguide amplifier means containing a diatomic molecular gas; means for combining said $CO_2$ laser pump radiation and said Stokes radiation to form a copropagating beam; means for injecting said copropagating beam into said waveguide amplifier means to induce amplification of said Stokes radiation by Raman scattering of said $CO_2$ laser pump radiation using rotational transitions in said diatomic molecular gas; means for feeding back a first portion of amplified Stokes radiation for reinjection into said capillary waveguide amplifier in the same direction as said copropagating beam to cause said copropagating beam and said amplified Stokes radiation to copropagate through said waveguide amplifier means to increase spatial and temporal overlap and extraction of energy from said $CO_2$ laser pump radiation; means for directing a second portion of said amplified Stokes signal through backward Raman waveguide amplifier means in a predetermined direction; means for directing partially depleted $CO_2$ laser pump radiation emitted from said capillary waveguide amplifier means through said backward Raman waveguide amplifier means in a direction opposite to said predetermined direction; whereby said partially depleted $CO_2$ laser pump radiation and said second portion of said amplified Stokes signal counterpropagate through said backward Raman waveguide amplifier means to produce backward Raman amplification, pulse compression, and efficient energy extraction from said partially depleted $CO_2$ laser pump radiation.

The present invention may also comprise, in accordance with its objects and purposes, a combination regenerative ring oscillator and backward Raman waveguide amplifier system comprising: $CO_2$ laser means for producing a $CO_2$ laser pump signal; means for directing said $CO_2$ laser pump signal through Raman waveguide amplifier means to spontaneously generate a Stokes signal by Raman scattering of said $CO_2$ laser pump signal using rotational transitions in a diatomic molecular gas; means for feeding back a first portion of said Stokes signal into said regenerative ring oscillator to increase the intensity of Stokes radiation in said regenerative ring oscillator and thereby increase the amount of energy extracted from said $CO_2$ laser pump signal; means for directing a second portion of said Stokes signal through a backward Raman waveguide amplifier system in a predetermined direction; means for directing said $CO_2$ laser pump signal emitted from said Raman waveguide amplifier means through said backward Raman waveguide amplifier system in a direction opposite to said predetermined direction; whereby said $CO_2$ laser pump signal and said second portion of said Stokes signal counterpropagate through said backward Raman waveguide amplifier means to produce backward Raman amplification, pulse compression, and efficient energy extraction from said $CO_2$ laser pump signal.

The advantages of the present invention are that the combination regenerative ring configuration and backward Raman waveguide amplifier is capable of converting a large portion of the $CO_2$ pump signal to Stokes frequency in the ring cavity configuration using either low intensity external Stokes sources or by spontaneous generation in the ring cavity and subsequently, causing the $CO_2$ laser pump signal and the amplified Stokes radiation signal to counterpropagate through backward Raman waveguide amplifier means to produce backward Raman amplification, pulse compression, and efficient energy extraction from the $CO_2$ laser pump signal. The combination of these factors allows a virtually complete extraction of energy from the $CO_2$ laser pump signal and pulse compression of the Stokes signal.

BRIEF DESCRIPTION OF THE DRAWINGS

The accompanying drawings, which are incorporated in and form a part of the specification, illustrate the preferred embodiment of the present invention, and together with the description, serve to explain the principles of the invention. In the drawings:

FIG. 3 is a schematic illustration of the combination regenerative ring oscillator and backward Raman waveguide amplifier of the preferred embodiment of the invention.

FIG. 4 is a schematic illustration of the combination regenerative ring oscillator and multistaged backward Raman waveguide amplifier of the present invention.

DETAILED DESCRIPTION OF THE PREFERRED EMBODIMENT OF THE INVENTION

Figure 1:
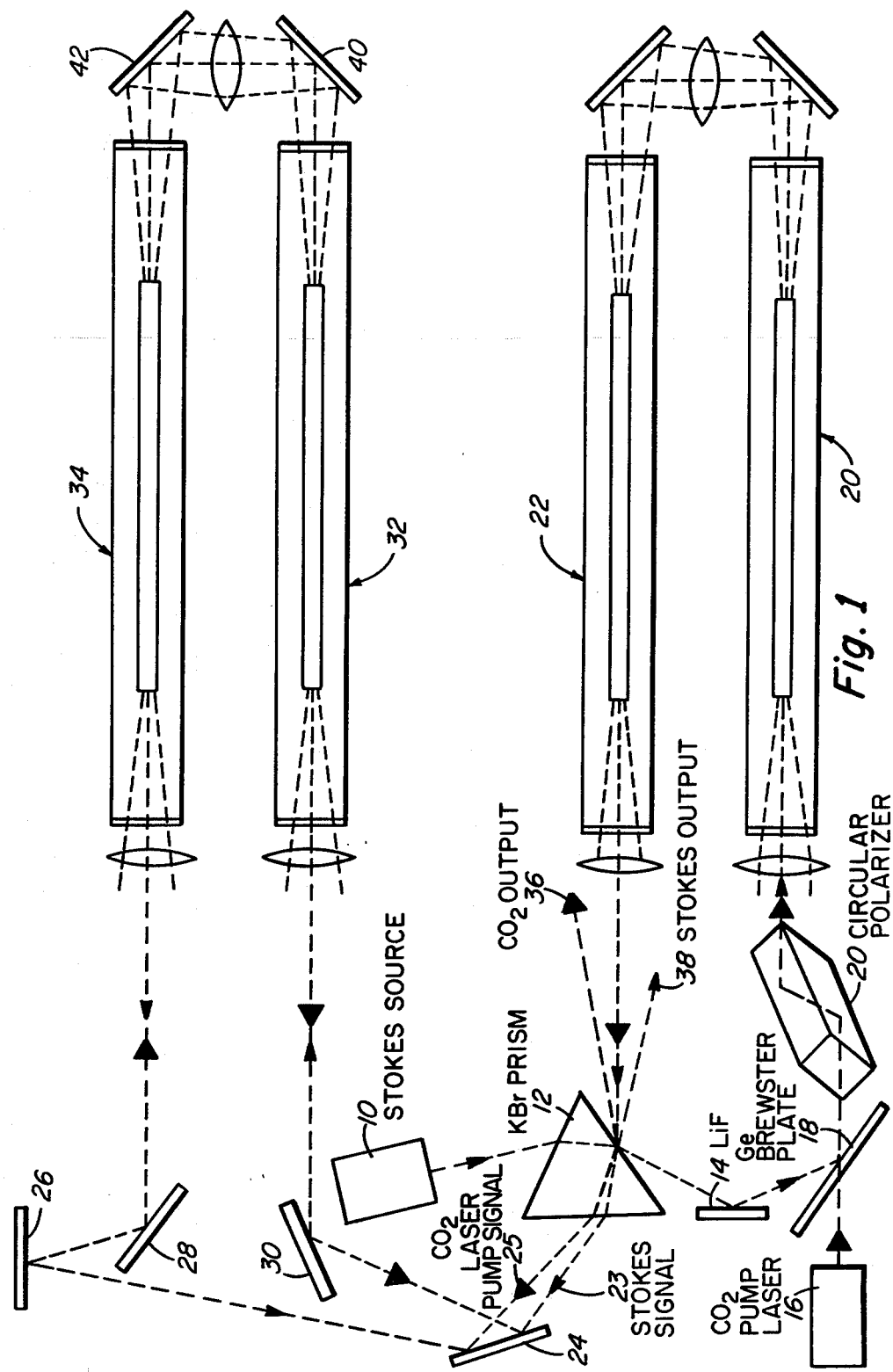
FIG. 1 is a schematic diagram of the combination regenerative ring and backward Raman amplifier of the preferred embodiment of the present invention.

FIG. 1 illustrates a combination regenerative ring and backward Raman waveguide amplifier comprising one configuration for implementing the preferred embodiment of the invention. As illustrated in FIG. 1, an external Stokes source 10 produces a Stokes signal which is applied to KBr prism 12 and subsequently directed to LiF reflector 14. LiF reflector 14 is utilized to reject $CO_2$ laser radiation. Of course, other devices can be used in place LiF reflector 14. $CO_2$ pump laser 16 produces a $CO_2$ pump signal which is combined with the Stokes signal by Ge brewster plate 18. The copropagating beam is then applied to circular polarizer 20 which can comprise a Fresnel rhomb or other suitable circular polarizers such as disclosed in W. H. Southwell, "Multi-Layer High Reflective Coating Designs Achieving Broad Band 90° Phase Change," Society of Photo-Optical Instrumentation Engineers, 190, 81–88, LASL Optics Conference (1979), to circularly polarize both the $CO_2$ pump signal and Stokes signal in opposite polarization directions. The copropagating beam is then applied to Raman waveguide amplifiers 20 and 22 for Raman amplification of the Stokes signal. The copropagating beam is then partially reflected by KBr prism 12 for reinjection into the ring cavity configuration. However, a major portion of both the amplified Stokes signal and partially depleted $CO_2$ laser pump signal are refracted by KBr prism 12 and applied to reflector 24. Reflectors 24 through 30 direct the Stokes signal and $CO_2$ laser pump signal through backward Raman waveguide amplifiers 32 and 34 in opposite directions. The partially depleted $CO_2$ laser pump signal and the amplified Stokes radiation signal counterpropagate through the backward Raman waveguide amplifiers to produce backward Raman amplification, pulse compression, and efficient energy extraction from the $CO_2$ laser pump signal. The amplified Stokes signal is passed through the waveguide so that it meets the front portion of the $CO_2$ laser pump signal in the waveguides 32 and 34 before the $CO_2$ laser pump signal exits. The position at which the two pulses meet can be adjusted by changing the relative path lengths by adjusting mirrors 20 through 30. The $CO_2$ laser pump signal and the amplified Stokes signal exiting from the backwards Raman waveguide amplifier are transmitted by KBr prism 12 to produce $CO_2$ output 36 and Stokes output 38.

It should also be noted that it is convenient to have one of the two paths of the beams reflected by an even number of reflectors (such as reflectors 24–30) rather than a single reflector so that the sense of the circular polarization is correct for maximum gain of the counterpropagating beams. This can also be accomplished by changing the configuration to have either one or three mirrors in place of mirrors 40 and 42. Although the KBr prism introduces some ellipticity to the beams because it reflects more of one polarization than the other, this effect can be corrected if necessary by a compensator plate which reflects more of the other polarization.

For counterpropagating beams, it is well-known, as disclosed by M. Maier, W. Kaiser, and J. A. Giordemaine, Phys. Rev. Lett. 17, 1275 (1966); Phys. Rev. 177, 580 (1969); A. J. Glass, IEEE J. Quantum Electron. QE-3, 516 (1967); W. H. Culver, J. T. A. Vanderslice, and V. W. T. Townsend, Appl. Phys. Lett. 12, 189 (1968); J. R. Murray, J. Goldhar, and A. Szoke, Appl. Phys. Lett. 32, 551 (1978); J. R. Murray, J. Goldhar, D. Eimerl, and A. Szoke, Appl. Phys. Lett. 33, 399 (1978), that the Stokes beam can extract energy from the entire pump beam and can exit from the amplifying medium as a pulse of much shorter duration and higher peak power than the incident pump. Consequently, utilizing backward Raman amplifiers, such as amplifiers 32 and 34 of the present invention, it possible to deplete a relatively long $CO_2$ pump signal (e.g., 200 nsec) and obtain a Stokes output (e.g., 50 nsec) which is compressed by a considerable amount.

Control over the amount of compression can be achieved by adjusting the relative overlap position of the two counterpropagating beams or by tailoring the temporal shape of the input $CO_2$ pump signal. For example, if the $CO_2$ pump signal consists of a series of three ~30 nsec smooth pulses separated by 60 nsec each, and the waveguides are fabricated to be ~30 ft. long with a total round trip time of 90 nsec, allowing for input and output optics, so that each feedback pulse is synchronous with the subsequent input pulse, it is possible to reach overall gains well in excess of $e^{30}$ during the transit of the third pulse and hence convert a significant portion of the third pulse to Stokes frequency. In the case where the $CO_2$ pulse train is delayed by ~90 nsec and then passed through the two additional waveguides 32 and 34 illustrated in FIG. 1, the first $CO_2$ pulse will meet the third Stokes pulse when the third Stokes pulse is ~ midway through the waveguide. The third Stokes pulse should completely deplete the first two $CO_2$ pulses as the third Stokes pulse passes through the first two $CO_2$ pulses in waveguides 32 and 34. Normally, strong pulse steepening will occur since the leading edge of the Stokes pulse encounters undepleted $CO_2$ laser pump energy which provides the highest gain. If a pulse shorter than desirable is produced, compensation can be provided by further delaying the $CO_2$ laser pump signal so that the leading edge of the Stokes pulse does not overlap fully with the $CO_2$ laser pump signal in the backward Raman waveguide amplifier.

Figure 2:
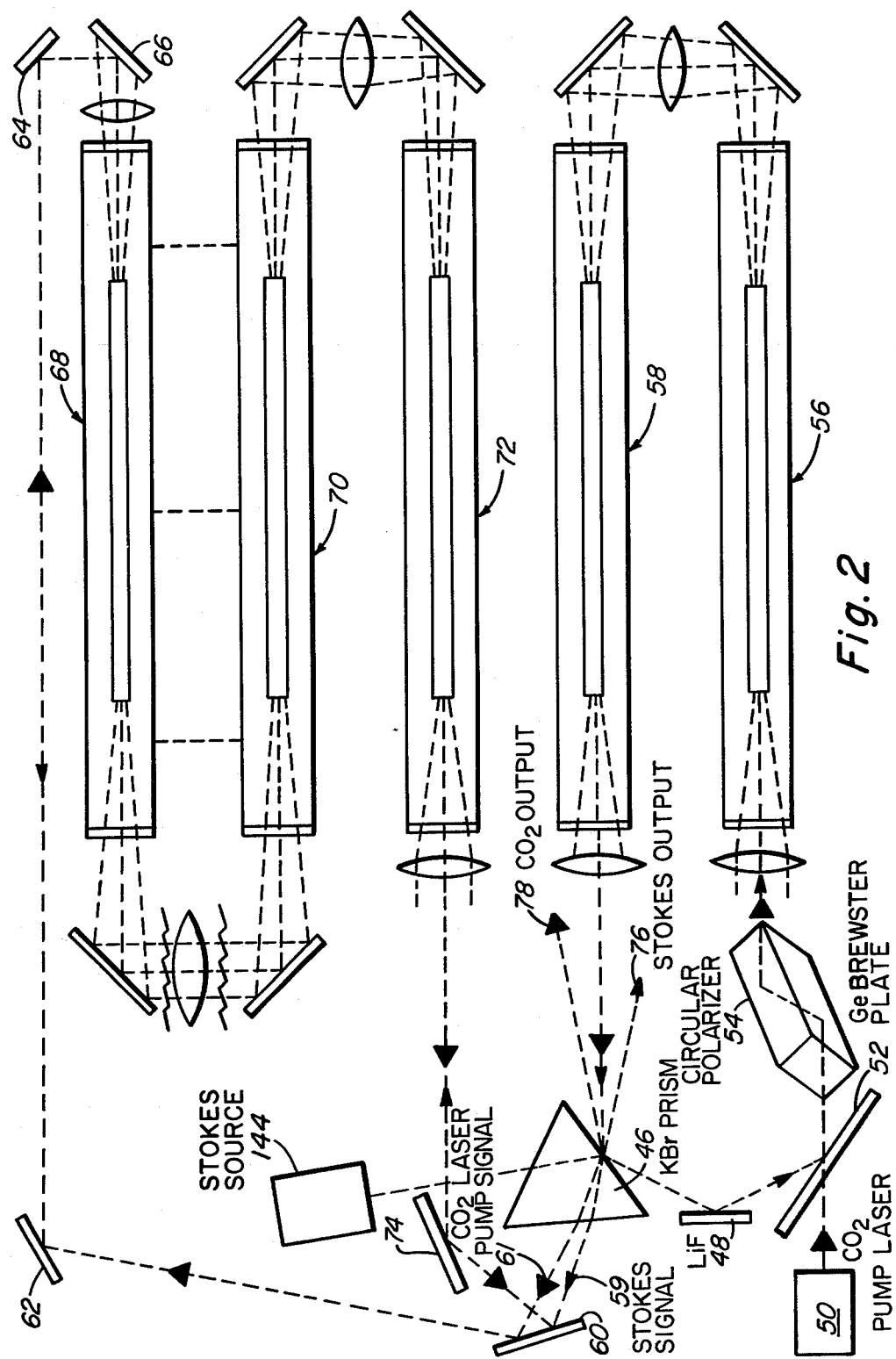
FIG. 2 is a schematic illustration of a combination regenerative ring and multistaged backward Raman waveguide amplifier of the preferred embodiment of the invention.

FIG. 2 illustrates a combination regenerative ring and backward Raman waveguide amplifier similar to the device illustrated in FIG. 1. The device illustrated in FIG. 2 operates in the same manner as the device illustrated in FIG. 1 with the exception of one or more additional backward Raman waveguide amplifiers, such as backward waveguide Raman amplifier 68. The arrangement illustrated in FIG. 2 allows for extraction of energy from three or more $CO_2$ laser pump signals. Additionally, the desired amount of delay can be easily introduced by positioning of reflector 62 and 64.

FIG. 3 illustrates a combination regenerative ring oscillator and backward Raman waveguide amplifier system in accordance with the preferred embodiment of the invention. As illustrated in FIG. 3, $CO_2$ pump laser 10 produces a $CO_2$ laser pump signal which is transmitted through Ge brewster plate 12 to circular polarizer 14 which circularly polarizes the $CO_2$ laser pump signal. The circularly polarized $CO_2$ laser pump signal exiting from circular polarizer 14 is applied to Raman waveguide amplifiers 16 and 18 where a Stokes signal is spontaneously generated. A portion of the $CO_2$ laser pump signal and Stokes signal is partially reflected from the surface of KBr prism 20 onto LiF reflector 22. LiF reflector 22 rejects the $CO_2$ laser pump signal and reflects the Stokes signal to Ge brewster plate 12 where it is combined with the $CO_2$ laser pump signal to provide a regenerative ring configuration. The Stokes signal which was spontaneously generated in Raman waveguide amplifiers 86 and 88 is reinjected into these amplifiers for further amplification.

The Stokes signal 94 and $CO_2$ laser pump signal 96 which was not reflected from the surface of KBr prism 90, is reflected by reflector 98 and reflector 104 and reflectors 100 and 102, respectively. The Stokes signal 94 and $CO_2$ laser pump signal 96 counterpropagate through Raman waveguide amplifiers 106 and 108 to produce backward Raman amplification, pulse compression, and efficient energy extraction from the $CO_2$ laser pump signal as disclosed above.

FIG. 4 discloses a combination regenerative ring oscillator and backward Raman waveguide amplifier system such as disclosed in FIG. 3 with one or more additional backward Raman waveguide amplifiers such as backward Raman waveguide amplifier 138. Again, the system schematically illustrated in FIG. 4 operates in the same manner as the system illustrated in FIG. 3 with exception that one or more additional backward Raman waveguide amplifiers can be added to extract energy from additional or longer $CO_2$ pulses. As disclosed in FIG. 2, reflectors 132 and 134 readily provide the delay necessary for the $CO_2$ laser pump signal 130.

The present invention therefore provides a combination regenerative ring amplifier and backward Raman waveguide amplifier system and a combination regenerative ring oscillator and backward Raman waveguide amplifier system which overcomes many disadvantages and limitations of the prior art. The regenerative ring oscillator and regenerative ring amplifier increased temporal and spatial overlap of the $CO_2$ and Stokes radiation signals in a simple and efficient system. This allows for greater extraction of $CO_2$ energy and provides for higher intensity Stokes output signals to be injected into the backward Raman waveguide amplifier system. The backward Raman waveguide amplifier system allows for even greater extraction of energy from the $CO_2$ laser pump signal by backward Raman amplification which produces pulse compression, allowing for a greatly amplified, short duration output Stokes signal. At the same time, the device of the present invention avoids problems of breakdown threshold and the use of damage-prone elements such as dichroic mirrors which can greatly reduce the performance of this system.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, any suitable Raman waveguide amplifier system can be utilized in accordance with the present invention although a Raman capillary waveguide system has been illustrated in the drawings. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A combination regenerative ring and backward Raman waveguide amplifier comprising:
   $CO_2$ laser means for producing a $CO_2$ laser pump signal;
   Stokes radiation source means for producing a Stokes radiation signal;
   means for combining said $CO_2$ laser pump signal and said Stokes radiation signal to produce a combined copropagating $CO_2$ laser pump signal and Stokes radiation signal;
   means for directing said copropagating $CO_2$ laser pump signal and Stokes radiation signal through Raman waveguide amplifier means to produce an amplified Stokes radiation signal by Raman scattering of said $CO_2$ laser pump signal using rotational transitions in a diatomic molecular gas;
   means for splitting said amplified Stokes radiation signal and said $CO_2$ laser pump signal into first and second portions;
   means for combining said first portion of said amplified Stokes radiation signal with said combined copropagating $CO_2$ laser pump signal and said Stokes radiation signal in a single beam path to increase the intensity of Stokes radiation in said regenerative ring amplifier and thereby increase the amount of energy extracted from said $CO_2$ laser pump signal;
   means for directing said second portion of said amplified Stokes radiation signal through backward Raman waveguide amplifier means in a first direction;
   means for directing said second portion of said $CO_2$ laser pump signal through said backward Raman waveguide amplifier means in a second direction, opposite to said first direction, so that said $CO_2$ laser pump signal and said amplified Stokes radiation signal counterpropagate through said backward Raman waveguide amplifier means to produce backward Raman amplification, pulse compression, and efficient energy extraction from said $CO_2$ laser pump signal.

2. The amplifier of claim 1 wherein said diatomic molecular gas comprises para-$H_2$.

3. A combination ring cavity for a Stokes injected Raman waveguide amplifier and backward Raman waveguide amplifier system comprising:
   a source of $CO_2$ laser pump radiation;
   an external source of Stokes radiation;
   waveguide amplifier means containing a diatomic molecular gas;
   means for combining said $CO_2$ laser pump radiation and said Stokes radiation to form a copropagating beam;
   means for injecting said copropagating beam into said waveguide amplifier means to induce amplification of said Stokes radiation by Raman scattering of said $CO_2$ laser pump radiation using rotational transitions in said diatomic molecular gas;
   means for feeding back a first portion of amplified Stokes radiation for reinjection into said capillary waveguide amplifier in the same direction as said copropagating beam to cause said copropagating beam and said amplified Stokes radiation to copropagate through said waveguide amplifier means to increase spatial and temporal overlap and extraction of energy from said $CO_2$ laser pump radiation;
   means for directing a second portion of said amplified Stokes signal through backward Raman waveguide amplifier means in a predetermined direction;
   means for directing partially depleted $CO_2$ laser pump radiation emitted from said capillary waveguide amplifier means through said backward Raman waveguide amplifier means in a direction opposite to said predetermined direction;

whereby said partially depleted $CO_2$ laser pump radiation and said second portion of said amplified Stokes signal counterpropagate through said backward Raman waveguide amplifier means to produce backward Raman amplification, pulse compression and efficient energy extraction from said partially depleted $CO_2$ laser pump radiation.

4. The amplifier of claim 3 wherein said diatomic molecular gas comprises para-$H_2$.

5. A combination regenerative ring oscillator and backward Raman waveguide amplifier system comprising:

$CO_2$ laser means for producing a $CO_2$ laser pump signal;

means for directing said $CO_2$ laser pump signal through Raman waveguide amplifier means to spontaneously generate a Stokes signal by Raman scattering of said $CO_2$ laser pump signal using rotational transitions in a diatomic molecular gas;

means for feeding back a first portion of said Stokes signal into said regenerative ring oscillator to increase the intensity of Stokes radiation in said regenerative ring oscillator and thereby increase the amount of energy extracted from said $CO_2$ laser pump signal;

means for directing a second portion of said Stokes signal through a backward Raman waveguide amplifier system in a predetermined direction;

means for directing said $CO_2$ laser pump signal emitted from said Raman waveguide amplifier means through said backward Raman waveguide amplifier system in a direction opposite to said predetermined direction;

whereby said $CO_2$ laser pump signal and said second portion of said Stokes signal counterpropagate through said backward Raman waveguide amplifier means to produce backward Raman amplification, pulse compression, and efficient energy extraction from said $CO_2$ laser pump signal.

6. The amplifier of claim 5 wherein said diatomic molecular gas comprises para-$H_2$.

* * * * *